United States Patent
O'Neal et al.

(10) Patent No.: US 11,851,328 B2
(45) Date of Patent: *Dec. 26, 2023

(54) REVERSE FLOW REACTOR REGENERATION USING HIGH HEAT CAPACITY FLUIDS

(71) Applicant: ExxonMobil Technology and Engineering Company, Annandale, NJ (US)

(72) Inventors: Everett J. O'Neal, Asbury, NJ (US); Anastasios I. Skoulidas, Pittstown, NJ (US); Zhiyan Wang, The Woodlands, TX (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 750 days.

This patent is subject to a terminal disclaimer.

(21) Appl. No.: 16/838,399

(22) Filed: Apr. 2, 2020

(65) Prior Publication Data
US 2020/0317515 A1 Oct. 8, 2020

Related U.S. Application Data

(60) Provisional application No. 62/829,793, filed on Apr. 5, 2019.

(51) Int. Cl.
*C01B 3/38* (2006.01)
*B01J 8/04* (2006.01)
(Continued)

(52) U.S. Cl.
CPC ............ *C01B 3/384* (2013.01); *B01D 53/047* (2013.01); *B01J 8/0492* (2013.01); *B01J 8/0496* (2013.01);
(Continued)

(58) Field of Classification Search
CPC ............ C01B 3/384; C01B 2203/0233; C01B 2203/0822; B01J 8/0492; B01J 8/0496; C02B 2203/1241
(Continued)

(56) References Cited

U.S. PATENT DOCUMENTS 7,491,250 B2   2/2009   Hershkowitz et al.
7,740,289 B2   1/2010   Tang
(Continued)

OTHER PUBLICATIONS

The International Search Report and Written Opinion for PCT/US2020/026345 dated Jul. 22, 2020.

*Primary Examiner* — Douglas B Call
(74) *Attorney, Agent, or Firm* — SHOOK, HARDY & BACON L.L.P.

(57) ABSTRACT

Systems and methods are provided for using a high heat capacity gas as at least a portion of the diluent during the regeneration step of a reverse flow reactor process. Instead of using nitrogen or air as the primary diluent gas, $CO_2$ and/or $H_2O$ can be added as diluent gas for the regeneration step in the reaction cycle. Increasing the heat capacity of the diluent gas provides a reduction in the peak temperature within the reactor relative to the amount of fuel combusted during regeneration. This can allow for a reduction in the volume of diluent used during regeneration and/or an increase in the amount of fuel used. Reducing the volume of diluent can reduce the pressure drop during regeneration, which can provide a corresponding reduction in the amount of compression required for recycle of the diluent. Increasing the amount of fuel can allow for a corresponding increase in the amount of endothermic reaction performed during the reaction step.

14 Claims, 6 Drawing Sheets

(51) Int. Cl.
| | |
|---|---|
| *B01D 53/047* | (2006.01) |
| *B01J 19/24* | (2006.01) |
| *B01J 38/40* | (2006.01) |
| *C01B 3/48* | (2006.01) |
| *C01B 3/56* | (2006.01) |
| *B01J 12/00* | (2006.01) |
| *B01J 23/34* | (2006.01) |
| *B01J 23/92* | (2006.01) |
| *B01J 35/04* | (2006.01) |
| *B01J 38/14* | (2006.01) |
| *C01B 3/40* | (2006.01) |

(52) U.S. Cl.
CPC ......... *B01J 12/007* (2013.01); *B01J 19/2465* (2013.01); *B01J 23/34* (2013.01); *B01J 23/92* (2013.01); *B01J 35/04* (2013.01); *B01J 38/14* (2013.01); *B01J 38/40* (2013.01); *C01B 3/40* (2013.01); *C01B 3/48* (2013.01); *C01B 3/56* (2013.01); *B01D 2256/16* (2013.01); *B01D 2257/502* (2013.01); *B01D 2257/504* (2013.01); *B01D 2257/80* (2013.01); *C01B 2203/0233* (2013.01); *C01B 2203/0283* (2013.01); *C01B 2203/042* (2013.01); *C01B 2203/0475* (2013.01); *C01B 2203/0822* (2013.01); *C01B 2203/1094* (2013.01); *C01B 2203/1241* (2013.01)

(58) Field of Classification Search
USPC .......................................................... 252/373
See application file for complete search history.

(56) References Cited

U.S. PATENT DOCUMENTS

| | | |
|---|---|---|
| 7,740,829 B2 | 6/2010 | Becker et al. |
| 7,815,873 B2 | 10/2010 | Sankaranarayanan et al. |
| 8,754,276 B2 | 1/2014 | Buchanan et al. |
| 2004/0170559 A1 | 9/2004 | Hershkowitz et al. |
| 2004/0180973 A1* | 9/2004 | Hershkowitz ............. C01B 3/46 518/703 |
| 2004/0241505 A1 | 12/2004 | Hershkowitz et al. |
| 2011/0000671 A1 | 1/2011 | Hershkowitz et al. |
| 2012/0023822 A1* | 2/2012 | D'Agostini .............. C10J 3/723 48/197 R |
| 2012/0111315 A1 | 5/2012 | Grenda et al. |

* cited by examiner

REVERSE FLOW REACTOR REGENERATION USING HIGH HEAT CAPACITY FLUIDS

CROSS REFERENCE OF RELATED APPLICATIONS

This application claims priority to U.S. Provisional Application Ser. No. 62/829,793 filed Apr. 5, 2019, which is herein incorporated by reference in its entirety.

FIELD OF THE INVENTION

This invention relates to methods for regeneration of reverse flow reactors.

BACKGROUND OF THE INVENTION

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat Nos. 7,815,873 and 8,754,276 provide examples of using reverse flow reactors to perform various endothermic processes in a cyclic reaction environment.

U.S. Pat. No. 7,740,289 describes production of synthesis gas in a reverse flow reactor by steam reforming followed by incomplete combustion of remaining hydrocarbons at elevated temperature and pressure. In addition to providing additional synthesis gas, the incomplete combustion provides heat to the reactor. In the method described in U.S. Pat. No. 7,740,289, the reversal of flow is achieved by alternating the end of the reactor used for input of the reactant flows for performing the steam reforming and incomplete combustion. The resulting synthesis gas can then be used for production of methanol.

U.S. Patent Application Publication 2012/0111315 describes an in-situ vaporizer and recuperator that is suitable for use with an alternating flow system, such as a pressure swing reformer.

SUMMARY OF THE INVENTION

In an aspect, a method for operating a reactor is provided. The method includes reacting a fuel mixture comprising fuel, 0.1 vol % or more of $O_2$, and a diluent under combustion conditions in a combustion zone within a reactor to form a flue gas and to heat one or more surfaces in a reaction zone to a regenerated surface temperature of 800° C. or more. The diluent can include 25.0 vol % or more of a gas having a heat capacity at 1500 K of 40 J/mol*K or more relative to a volume of the diluent. The reaction zone can include a catalyst composition. The method can further include exposing a first reactant stream to the catalyst composition in the reaction zone at the regenerated surface temperature under endothermic reaction conditions to form a product stream. A direction of flow for the reactant stream within the reaction zone can be reversed relative to a direction of flow for the fuel mixture.

In another aspect, a reverse flow reactor system is provided. The system can include a reactor comprising a reactor inlet end and a regenerator inlet end. The system can further include a recycle loop providing intermittent fluid communication between the reactor inlet end and the regenerator inlet, the recycle loop including a recycle compressor and a fuel source inlet. The system can further include one or more supplemental diluent inlets in fluid communication with at least one of the recycle loop and the fuel source inlet.

BRIEF DESCRIPTION OF THE DRAWINGS

FIG. 4 shows regeneration gas flow rates and corresponding temperature profile during the reaction cycle for steam reforming in a reverse flow reactor.

FIG. 6 schematically shows an example of operation of a reverse flow reactor.

DETAILED DESCRIPTION OF THE EMBODIMENTS

All numerical values within the detailed description and the claims herein are modified by "about" or "approximately" the indicated value, and take into account experimental error and variations that would be expected by a person having ordinary skill in the art.

Overview

In various aspects, systems and methods are provided for using a high heat capacity gas as at least a portion of the diluent during the regeneration step of a reverse flow reactor process. Instead of using nitrogen or air as the primary diluent gas, $CO_2$ and/or $H_2O$ can be added as diluent gas for the regeneration step in the reaction cycle. Increasing the heat capacity of the diluent gas provides a reduction in the peak temperature within the reactor relative to the amount of fuel combusted during regeneration. This can allow for a reduction in the volume of diluent used during regeneration and/or an increase in the amount of fuel used. Reducing the volume of diluent can reduce the pressure drop during regeneration, which can provide a corresponding reduction in the amount of compression required for recycle of the diluent.

Increasing the amount of fuel can allow for a corresponding increase in the amount of endothermic reaction performed during the reaction step. Additionally, using a higher heat capacity diluent can reduce laminar flame speed during combustion.

Reverse flow reactors and/or other reactors with flows in opposite directions at different stages of a reaction cycle can be useful when performing endothermic reactions at elevated temperatures, such as temperatures of 600° C. or more, or 800° C. or more. A flow from a first direction, corresponding to a combustion or regeneration flow, can be used to heat a reaction zone within the reactor to a desired temperature. The reagents for a desired endothermic reaction can then be passed in using a flow in the opposite direction. The heat stored within the reactor during the regeneration step is used to provide heat for the desired endothermic reaction.

One of the challenges in operating a reverse flow reactor is managing the introduction of heat during the regeneration step. Introducing a larger amount of heat into the reactor during the regeneration step can allow for an increased amount of the corresponding endothermic reaction during the reaction step. However, the amount of heat that can be introduced is constrained by the need to avoid excessive temperature spikes in localized areas. For example, performing too much combustion at a single location could result in exceeding a maximum temperature for the structural materials and/or internal components of the reactor.

In order to overcome this difficulty, a diluent gas can be introduced during the regeneration step. The reactor can also be pressurized during regeneration to increase the amount of diluent gas per unit volume. In some aspects, the diluent gas corresponds to nitrogen or a composition that is substantially composed of nitrogen (i.e., air). The diluent gas absorbs a portion of the heat generated during combustion and carries the heat to downstream locations within the reactor (relative to the direction of flow in the regeneration step). This can allow additional heat to be introduced into the reactor while reducing the maximum temperature at any location.

Unfortunately, the amount of diluent gas introduced into the reactor can be substantial. In some aspects the diluent gas can correspond to 50 vol % or more of the flow into a reactor during the regeneration step, and can potentially be as much as an order of magnitude greater (or more) than the amount fuel that is introduced to generate heat (volume basis). This large volume of diluent gas can result in substantial pressure drops within a reactor, leading to substantial operating costs for compression. Larger reactor sizes could mitigate the pressure drops, but such increases in reactor size can create other processing difficulties. Additionally, increasing reactor footprint within a refinery is typically a less desirable outcome.

In various aspects, it has been discovered that using a diluent gas with a higher heat capacity can mitigate one or more of the difficulties associated with handling large volumes of diluent gas in the regeneration step for a reverse flow reactor. Using a higher heat capacity diluent gas can reduce the peak temperature that is produced during regeneration relative to the amount of fuel combusted. This can allow, for example, a reduction in the amount of diluent that is used (to decrease the pressure drop across the reactor during the regeneration step) and/or an increase in the amount of fuel is used (to increase the efficiency of the subsequent reaction step).

Additionally, it has been discovered that using a higher heat capacity gas as the diluent during the regeneration step can provide an unexpected decrease in the laminar flame speed of the combustion reaction at temperatures of 600° C. or more. A higher laminar flame speed corresponds to faster combustion. Decreasing the laminar flame speed of the combustion reaction during the regeneration step can expand the distance within the reactor where the combustion reaction occurs. This spreading out of the combustion region can provide a further unexpected reduction in maximum temperature when combustion is performed at temperatures of 600° C. or more, or 700° or more, or 800° C. or more, such as up to 1500° C. or possibly still higher.

In some aspects, addition of a high heat capacity gas to the diluent can reduce the laminar flame speed at temperature of 600° C. or more, or 700° C. or more, or 800° C. or more, to 100 cm/s or less, or 75 cm/s or less. It is noted that the decrease in laminar flame speed may be due in part to improved radical quenching by the higher heat capacity gas In some aspects, $CO_2$, $H_2O$, or a combination thereof can be used as the high heat capacity gas in the diluent during the regeneration step. The $CO_2$ and/or $H_2O$ can be injected into the system at any convenient location. For example, the $CO_2$ and/or $H_2O$ can be added to the fuel and oxygen stream for combustion, or the $CO_2$ and/or $H_2O$ can be added to the recycle loop for the flue gas at any convenient location, or the $CO_2$ and/or $H_2O$ can be added at a plurality of locations. It is noted that some $CO_2$ and $H_2O$ can be present in the diluent gas in the absence of any additional injection. For example, in configurations where the diluent gas corresponds to a recycled flue gas from a reverse flow reactor, the recycled flue gas can be based on combustion of $H_2$ and/or hydrocarbons. If air is used to provide the oxygen for combustion, the majority of the diluent (prior to addition of supplemental high heat capacity gas) will be nitrogen. Without addition of supplemental high heat capacity gas, water will also be present in amounts of less than 20 vol % based on formation of water as a combustion product. Additionally, if the fuel includes hydrocarbons, less than 10 vol % of the diluent can correspond to $CO_2$ without addition of supplemental high heat capacity gas. By contrast, if the fuel substantially corresponds to $H_2$ (such as 90 vol % or more $H_2$) then the $CO_2$ concentration in the diluent without addition of a supplemental high heat capacity gas would be expected to be less than 2 vol %.

In some aspects, the amount of $CO_2$ in the diluent gas (after addition of supplemental high heat capacity gas) can correspond to 10 vol % to 90 vol % of the diluent gas, or 15 vol % to 90 vol %, or 20 vol % to 90 vol %, or 10 vol % to 60 vol %, or 15 vol % to 60 vol %, or 25 vol % to 60 vol %. It is noted that the amount of $CO_2$ in the diluent gas is determined without considering the amount of $O_2$ or the amount of fuel. Additionally or alternately, the amount of $H_2O$ in the diluent gas can correspond to 25 vol % to 90 vol % of the diluent gas, or 40 vol % to 90 vol %, or 25 vol % to 70 vol %, or 40 vol % to 70 vol %. In aspects where an oxygen source is available other than air, the combined amount of $CO_2$ and $H_2O$ in the diluent gas can correspond to up to 100% of the diluent. More generally, a high heat capacity diluent gas can correspond to a non-combustible gas with a heat capacity at 1500 K of 40 J/mol*K or more, or 45 J/mol*K or more, such as up to 100 J/mol*K or possibly still higher. In various aspects, the diluent can include 25 vol % to 100 vol % of such a high heat capacity diluent gas, or 25 vol % to 75 vol %, or 35 vol % to 100 vol %, or 35 vol % to 75 vol %, or 45 vol % to 100 vol % or 45 vol % to 75 vol %. For example, $CO_2$ has a heat capacity at 1500 K of roughly 59 J/mol*K and $H_2O$ has a heat capacity at 1500 K of roughly 46 J/mol*K. By contrast, $N_2$ has a heat capacity at 1500 K of roughly 35 J/mol*K. In some aspects, the diluent gas can have an average heat capacity at 1500 K of 38 J/mol*K or more, or 40 J/mol*K or more, such as up to 80 J/mol*K or possibly still higher. The average heat capacity can be calculated as the average of the heat capacities of the gases in the diluent, weighted by the relative number of moles of each gas in the diluent. The above values correspond to values at roughly 100 kPa.

Reverse flow reactors and/or other reactors with flows in opposite directions at different stages of a reaction cycle can be useful when performing endothermic reactions at elevated temperatures. Examples of elevated temperatures correspond to 600° C. or more, or 800° C. or more, such as up to 1600° C. or possibly still higher. A flow from a first direction, corresponding to a combustion or regeneration flow, can be used to heat a reaction zone within the reactor to a desired temperature. The reagents for a desired reaction can then be passed in using a flow in the opposite direction. The heat stored within the reactor during the regeneration step is used to provide heat for the desired endothermic reaction.

In this discussion, unless otherwise specified, description of temperatures within the reaction zone corresponds to temperatures measured at the location where the maximum temperature occurs in the reaction zone at the end of the regeneration step. The location of the maximum temperature in the reaction zone at the end of the regeneration step is typically at or near the boundary between the reaction zone and the recuperation zone. The boundary between the reaction zone and the recuperation zone is defined as the location where the catalyst for the endothermic reaction begins in the reactor.

In this discussion, unless otherwise specified, all volume ratios correspond to volume ratios where the quantities in the ratio are specified based on volume at standard temperature and pressure (20° C., 100 kPa). This allows volume ratios to be specified consistently even though two flue gas volumes being compared may exist at different temperatures and pressures. When a volume ratio is specified for flue gases being delivered into a reactor, the corresponding flow rate of gas for a unit time under standard conditions can be used for the comparison.

Configuration Example

Figure 1:
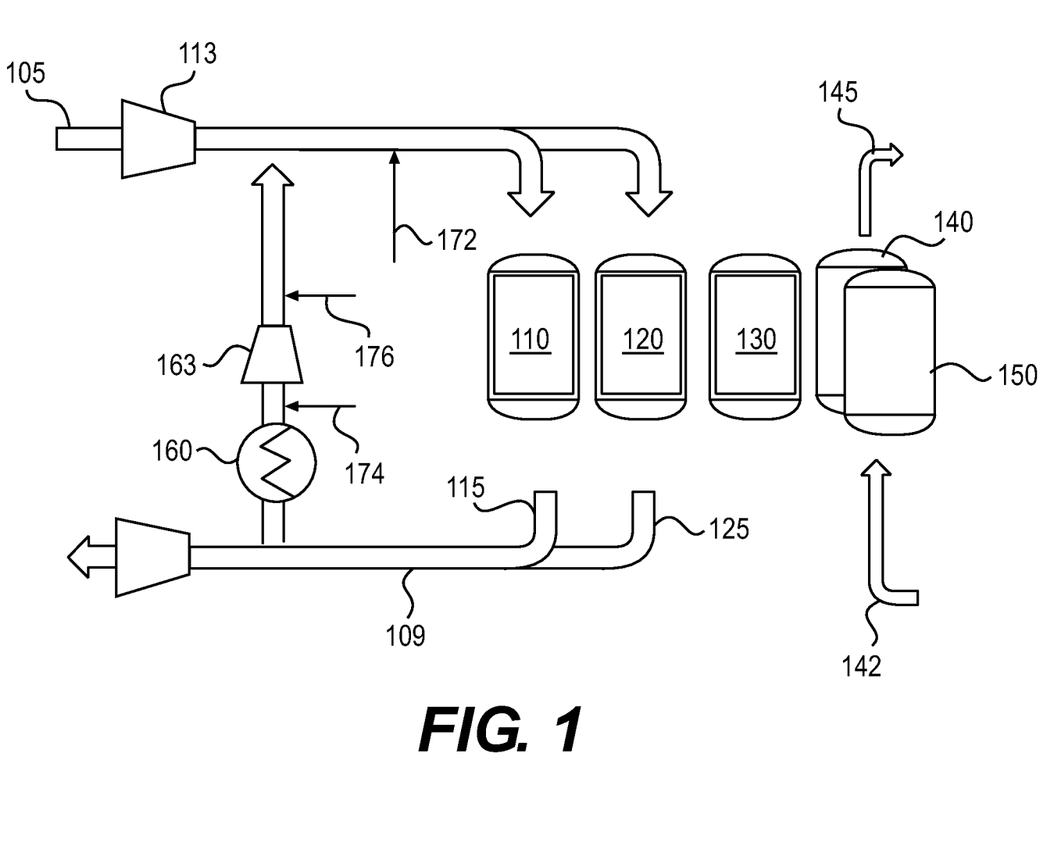
FIG. 1 shows an example of a configuration for using a plurality of reverse flow reactors to perform hydrocarbon reforming.

FIG. 1 shows an example of a reaction system suitable for using a high heat capacity gas as part of the diluent during regeneration. In the example shown in FIG. 1, the reaction system includes multiple reverse flow reactors. Although a total of five reactors are shown in FIG. 1, it is understood that any convenient number of reactors can be used. By using multiple reactors, a continuous or substantially continuous stream of reaction product can be provided as input to downstream parts of a refinery, chemical plant, or other facility.

In FIG. 1, reactors 110 and 120 correspond to reactors in the regeneration portion of the reaction cycle. Reactors 140 and 150 correspond to reactors in the endothermic reaction portion of the reaction cycle. For example, reactors 140 and 150 can be performing steam reforming, where an input stream 142 of steam and methane (and/or other reformable organics) is converted to a synthesis gas product 145. Reactor 130 corresponds to a reactor that is in-between the regeneration and reaction portions of the cycle. Depending on the length of each portion of the cycle, reactor 130 can alternatively correspond to another reactor in the regeneration portion of the cycle or another reactor in the reaction portion of the cycle. It is understood that the representation in FIG. 1 corresponds to a snapshot of the system at a given point in time. As the reaction cycle continues, the individual reactors will progress from reaction to regeneration and back again to reaction.

During regeneration, fuel and oxidant feed mixture 105 is passed into the reactors in the regeneration step, such as reactors 110 and 120. Compressor 113 can be used to increase the pressure of fuel and oxidant feed mixture 105 to the pressure used for both reactors. In addition to fuel and oxidant feed 105, reactors in regeneration also receive flue gas as a heat transfer fluid. In the configuration shown in FIG. 1, the flue gas 115 from reactor 110 and flue gas 125 from reactor 120 are mixed to form a common flue gas stream 109. A first portion 191 of common flue gas stream 109 is passed through a heat recovery stage, such as a waste heat boiler 160, followed by compression 163 to increase the recycled flue gas to the same pressure as fuel and oxidant feed mixture 105 prior to combining the flows. The remaining portion 193 of flue gas stream 109 is passed out of the reaction system, in order to maintain a desired level of gas within the reaction system.

In FIG. 1, the flow path corresponding to the combination of flue gas 115 and 125 into common flue gas stream 109; the first portion 191; and the line where first portion 191 is combined with fuel mixture 105 corresponds to a recycle loop. The recycle loop provides fluid communication between the reactor inlet end of reactor 115 and/or 125 and the regenerator inlet end of reactor 115 and/or 125. The fluid communication is intermittent, as the fluid communication is only provided during the regeneration step. This can be managed, for example, by appropriate use of valves.

During a regeneration step, a high heat capacity diluent can be introduced into the reaction system at any convenient location. FIG. 1 shows three potential location. Location 172 corresponds to adding the high heat capacity diluent gas to the fuel and oxidant stream prior to entering the reactor 110 and reactor 120. Location 174 corresponds to adding the high heat capacity diluent gas to the first portion 191 of flue gas that is recycled for further use as diluent. Location 176 also corresponds to adding the high heat capacity diluent gas to the recycled first portion 191, but location 176 corresponds to adding the high heat capacity diluent gas after compressor 163. Any or all of these locations, and/or other locations, can be used for introducing a high heat capacity diluent gas.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

As an example, a reverse flow reactor system can include first and second reactors, oriented in a series relationship with each other with respect to a common flow path, and optionally but preferably along a common axis. The common axis may be horizontal, vertical, or otherwise. In other examples, a reverse flow reactor system can correspond to a single reactor that includes both a reaction zone and a recuperation zone.

During a regeneration step, reactants (e.g., fuel and oxygen) are permitted to combine or mix in a reaction zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to reduce or minimize waste of heat and overheating the second reactor. This heat is transferred, for example, to one or more surfaces in the second reactor and/or in the reaction zone for the endothermic reaction in a reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the endothermic reaction environment. In aspects where a single reactor is used, the heat produced by the reaction can be displaced into and/or at least partially through the reaction zone of the reactor, but preferably the displacement can also reduce or minimize waste of heat due to exit of heated gas from the reactor.

After regeneration or heating the second reactor media (which can include and/or correspond to one or more surfaces including a catalyst for an endothermic reaction), in the next/reverse step or cycle, reactants for the endothermic reaction methane (and/or natural gas and/or another hydrocarbon) can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

Figure 6A:
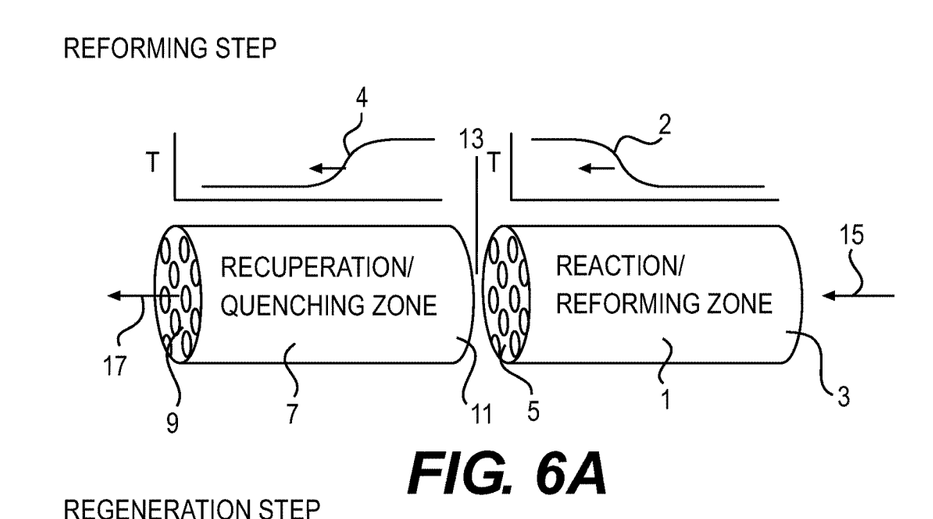
FIG. 6A shows the reforming step of a reforming reaction.
Figure 6B:
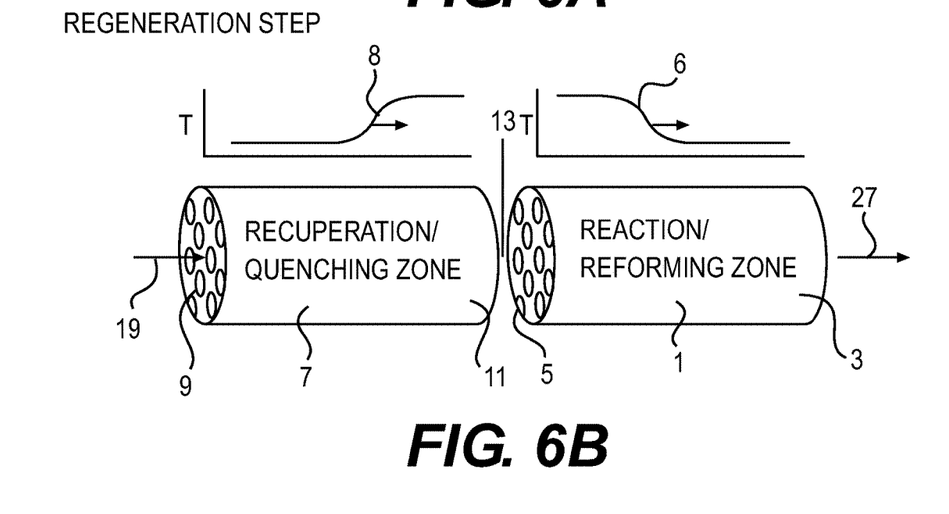
FIG. 6B shows a regeneration step of a reforming reaction.

For some aspects, the basic two-step asymmetric cycle of a reverse flow regenerative bed reactor system is depicted in FIGS. 6A and 6B of FIG. 6 in terms of a reactor system having two zones/reactors; a first or recuperator/quenching zone (7) and a second or reaction zone (1). Both the reaction zone (1) and the recuperator zone (7) can contain regenerative monoliths and/or other regenerative structures formed from a doped ceramic composition. Regenerative monoliths or other regenerative structures, as used herein, comprise materials that are effective in storing and transferring heat as well as being effective for carrying out a chemical reaction. The regenerative monoliths and/or other structures can correspond to any convenient type of material that is suitable for storing heat, transferring heat, and catalyzing a reaction. Examples of structures can include bedding or packing material ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. In some aspects, the catalytic ceramic monolith and/or other catalytic ceramic structure can be used without the presence of an additional washcoat.

To facilitate description of FIG. 6, the reactor is described herein with reference to a reforming reaction. It is understood that other convenient types of endothermic reactions can generally be performed using a reverse flow reactor, such as the reactor shown in FIG. 6.

As shown in FIG. 6B of FIG. 6, at the beginning of the "reaction" step of the cycle, a secondary end 5 of the reaction zone 1 (a.k.a. herein as the second reactor) can be at an elevated temperature as compared to the primary end 3 of the reaction zone 1, and at least a portion (including the first end 9) of the recuperator or quench zone 7 (a.k.a. herein as the first reactor), can be at a lower temperature than the reaction zone 1 to provide a quenching effect for the resulting product. In an aspect where the reactors are used to perform reverse flow reforming, a methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from reaction zone 1 and endothermically react to produce the desired synthesis gas product. As this step proceeds, a shift in the temperature profile 2, as indicated by the arrow, can be created based on the heat transfer properties of the system. When the ceramic catalyst monolith/other catalyst structure is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions. In aspects where another type of endothermic reaction is performed, a similar shift in temperature profile can occur, so that a temperature gradient moves across reaction zone 1 as the reaction step proceeds.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 6B of FIG. 6. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 6B, similar to but in opposite directions to the graphs of the temperature gradients developed during the reaction cycle in FIG. 6A of FIG. 6. Fuel and oxidant reactants may combust at a region proximate to the interface 13 of the recuperator zone 7 and the reaction zone 1. The heat recovered from the recuperator zone together with the heat of combustion can be transferred to the reaction zone, thermally regenerating the regenerative reaction monoliths and/or beds 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Figure 7:
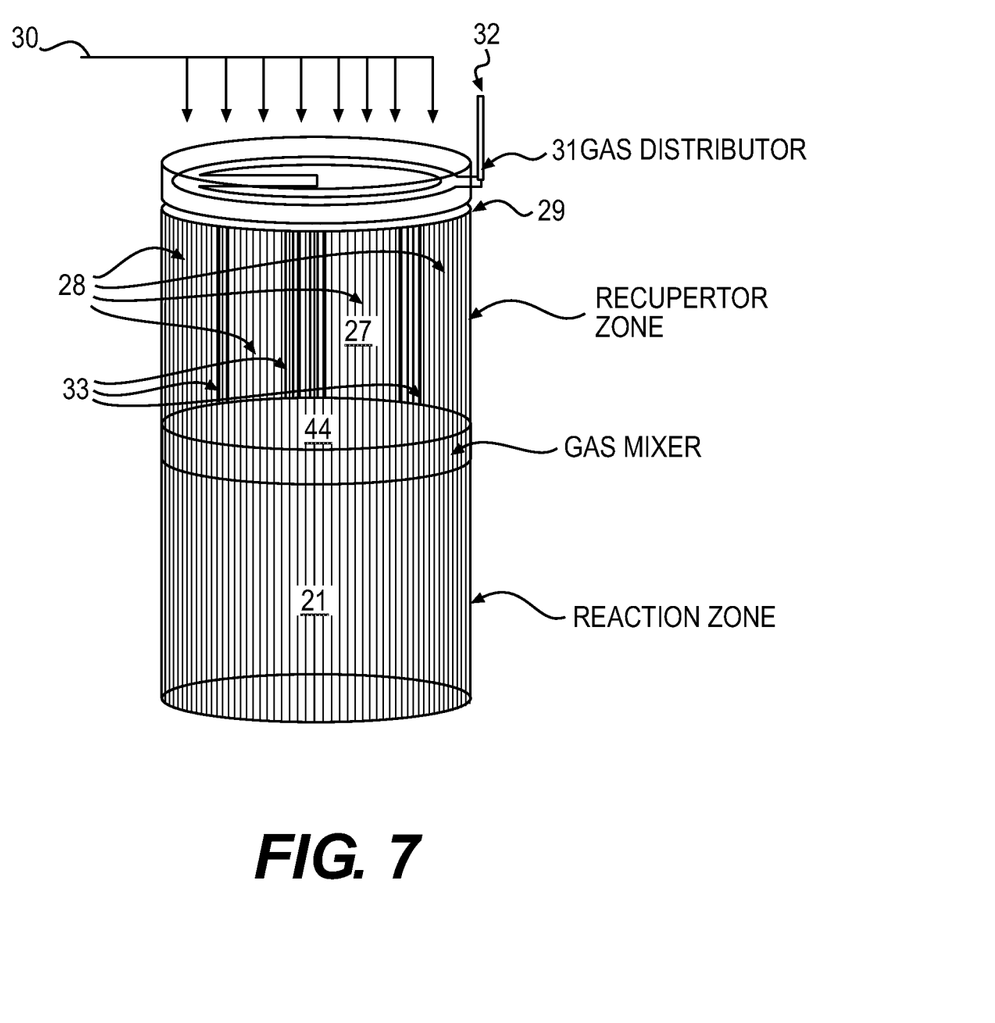
FIG. 7 schematically shows an example of a reverse flow reactor.

FIG. 7 illustrates another exemplary reactor system that may be suitable in some applications for controlling and deferring the combustion of fuel and oxidant to achieve efficient regeneration heat. FIG. 7 depicts a single reactor system, operating in the regeneration cycle. The reactor system may be considered as comprising two reactors zones. The recuperator 27 can be the zone primarily where quenching takes place and provides substantially isolated flow paths or channels for transferring both of the quenching reaction gases through the reactor media, without incurring combustion until the gasses arrive proximate or within the reactor core 13 in FIG. 6. The reformer 2 can be the reactor where regeneration heating and methane (and/or hydrocarbon) reformation primarily occurs, and may be considered as the second reactor for purposes herein. Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternately, some aspects may include a reformer reactor bed that is arranged different from and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

In aspects where a monolith is used, the monolith can have any convenient shape suitable for use as a catalytic surface. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 ft$^{-1}$ to 3000 ft$^{-1}$ (~0.16 km$^{-1}$ to ~10 km$^{-1}$), or from 100 ft$^{-1}$ to 2500 ft$^{-1}$ (~0.32 km$^{-1}$ to ~8.2 km$^{-1}$), or from 200 ft$^{-1}$ to 2000 ft$^{-1}$ (~0.65 km$^{-1}$ to ~6.5 km$^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 6A or 6B of FIG. 6.

Reactor media components can also provide for channels that include a packing that includes a high volumetric heat transfer coefficient (e.g., 0.02 cal/cm$^3$s° C. or more, or 0.05 cal/cm$^3$s° C. or more, or 0.10 cal/cal/cm$^3$s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/cm$^3$s° C. or more, or 0.20 cal/cm$^3$s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 6A and 6B of FIG. 6. The cited values are averages based upon the volume of reactor used for conveyance of a reactant.

In various aspects, adequate heat transfer rate can be characterized by a heat transfer parameter, $\Delta$THT, below 500° C., or below 100° C., or below 50° C. The parameter $\Delta$THT, as used herein, is the ratio of the bed-average volumetric heat transfer rate that is needed for recuperation, to the volumetric heat transfer coefficient of the bed, hv. The volumetric heat transfer rate (e.g. cal/cm$^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm$^3$) of the reactor (or portion of a reactor) traversed by the gas. The volumetric heat transfer coefficient of the bed, hv, can typically be calculated as the product of an area-based coefficient (e.g. cal/cm$^2$s° C.) and a specific surface area for heat transfer (av, e.g. cm$^2$/cm$^3$), often referred to as the wetted area of the packing.

In some aspects, a washcoat can be added to the formed, sintered ceramic composition. A washcoat can allow the sintered ceramic composition to be impregnated with additional catalytic metal.

One option for incorporating an additional catalytic metal into a washcoat can be to impregnate a catalyst support with the additional catalytic metal, such as by impregnation via incipient wetness. The impregnation can be performed with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional. Examples of additional catalytic metals can include, but are not limited to, Ni, Co, Fe, Pd, Rh, Ru, Pt, Ir, Cu, Ag, Au, Zr, Cr, Ti, V, and combinations thereof.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator 27. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In the exemplary embodiment of FIG. 7, a gas distributor 31 can direct a second gas stream 32 to second gas stream channels that are substantially isolated from or not in fluid communication with the first gas channels, here illustrated as channels 33. The result can be that at least a portion of gas stream 33 is kept separate from gas stream 30 during axial transit of the recuperator 27. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) 30 and 32 can each comprise a component that reacts with a component in the other reactant 30 and 32, to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 Volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator (27).

In various aspects, channels 28 and 33 can comprise ceramic (including zirconia), alumina, or other refractory material capable of withstanding temperatures exceeding 1200° C., or 1400° C., or 1600° C. Additionally or alternatively, channels 28 and 33 can have a wetted area between 50 $ft^{-1}$ and 3000 $ft^{-1}$, or between 100 $ft^{-1}$ and 2500 $ft^{-1}$, or between 200 $ft^{-1}$ and 2000 $ft^{-1}$.

Referring again briefly to FIG. 6, the reactor system can include a first reactor 7 containing a first end 9 and a second end 11, and a second reactor 1 containing a primary end 3 and a secondary end 5. The embodiments illustrated in FIGS. 6 and 7 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

Process Example—Reverse Flow Reforming and Regeneration

An example of a reaction that can be performed in a reverse flow reactor system is reforming of hydrocarbons under steam reforming conditions in the presence of $H_2O$, under dry reforming conditions in the presence of $CO_2$, or under conditions where both $H_2O$ and $CO_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step. During reactor regeneration, fuel, an oxidant, and a diluent are introduced into the reactor from a regeneration end of the reactor. The bed and/or monoliths in the regeneration portion of the reactor can absorb heat, but typically do not include a catalyst for reforming. As the fuel and oxidant pass through the regeneration section, heat is transferred from the regeneration section to the fuel and oxidant. Combustion does not occur immediately, but instead the location of combustion is controlled to occur in a middle portion of the reactor. The flow of the fuel, oxidant, and diluent continues during the regeneration step, leading to additional transfer of the heat generated from combustion into the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. In various aspects, at least a portion of the catalyst can correspond to a catalyst formed from a ceramic composition as described herein. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

The reforming reaction performed within the reactor can correspond reforming of methane and/or other hydrocarbons using steam reforming, in the presence of $H_2O$; using dry reforming, in the presence of $CO_2$, or using "bi" reforming in the presence of both $H_2O$ and $CO_2$. Examples of stoichiometry for steam, dry, and "bi" reforming of methane are shown in equations (1)-(3).

$$\text{Dry Reforming: } CH_4+CO_2=2CO+2H_2 \tag{1}$$

$$\text{Steam Reforming: } CH_4+H_2O=CO+3H_2 \tag{2}$$

$$\text{Bi Reforming: } 3CH_4+2H_2O+CO_2=4CO+8H_2. \tag{3}$$

As shown in equations (1)-(3), dry reforming can produce lower ratios of $H_2$ to CO than steam reforming. Reforming reactions performed with only steam can generally produce a ratio of $H_2$ to CO of around 3, such as 2.5 to 3.5. By contrast, reforming reactions performed in the presence of $CO_2$ can generate much lower ratios, possibly approaching a ratio of $H_2$ to CO of roughly 1.0 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of $H_2$ and CO in a synthesis gas can be different from the reaction stoichiometry. The equilibrium amounts can be determined based on the water gas shift equilibrium, which relates the concentrations of $H_2$, CO, $CO_2$ and $H_2O$ based on the reaction $$H_2O + CO \Leftrightarrow H_2 + CO_2 \quad (4)$$

Most reforming catalysts, such as rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen. In some aspects, an additional component present in the feed can correspond to impurities such as sulfur that can adsorb to the catalytic monolith during a reducing cycle (such as a reforming cycle). Such impurities can be oxidized in a subsequent cycle to form sulfur oxide, which can then be reduced to release additional sulfur-containing components (or other impurity-containing components) into the reaction environment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. It is noted that the location of combustion catalyst within the reactor(s) can overlap with the location of reforming catalyst within the reactor(s), so that some portions of the reactor(s) can correspond to both combustion zone and reaction zone. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 1100° C. or more, or 1200° C. or more, or 1300° C. or more, or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or $CO_2$. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or $CO_2$.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternately, with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C., or 1200° C. to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 hr$^{-1}$ to 50,000 hr$^{-1}$. The space velocity corresponds to the volume of reactants relative to the volume of monolith per unit time. The volume of the monolith is defined as the volume of the monolith as if it was a solid cylinder.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of 1.0 or less. In some aspects, the temperature during reforming can correspond to the temperature ranges described for steam reforming. Optionally, in some aspects a dry reforming reaction can be performed at a lower temperature of between 500° C. to 700° C., or 500° C. to 600° C. In such aspects, the ratio of $H_2$ to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Example 1—Laminar Flame Speeds at Elevated Temperature

Figure 2:
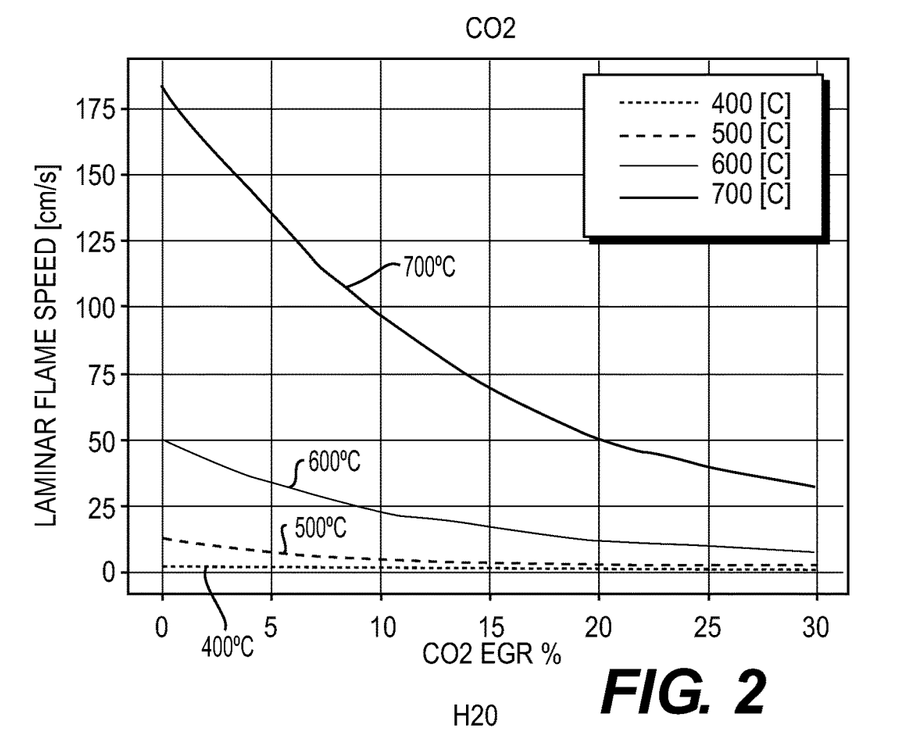
FIG. 2 shows flame speed with various amounts of $CO_2$ in the diluent gas during combustion.

A combustion model was used to determine the how the laminar flame speed changes based on changes in the composition of a diluent gas during combustion. In the modeled combustion reactions, a gas flow of $H_2$, $O_2$, and diluent was combusted. The amount of fuel corresponding to roughly 10% of the total gas flow. In a first set of tests, combustion was modeled at temperatures of 400° C., 500° C., 600° C., and 700° C. while using diluents that had various amounts of $CO_2$. FIG. 2 shows the flame speeds from the modeled combustion reactions. As shown in FIG. 2, at temperatures of 500° C. or less, the nature of the diluent gas had little or no impact on flame speed. However, at temperatures of 600° C. or more, the diluent gas corresponding to 100 vol % $N_2$ shows a substantial increase in flame speed. As $CO_2$ is blended into the diluent, the increase in flame speed is reduced, with unexpectedly large reductions in flame speed for $CO_2$ amounts of 10 vol % or more in the diluent. At 25 vol % or 30 vol % $CO_2$, the flame speed at 600° C. or more is reduced almost to the flame speed values at 500° C. or less.

It is noted that the model results for flame speed shown in FIG. 2 correspond to the flame speed for the combustion of $H_2$. The combustion of $H_2$ will result in production of $H_2O$. Any impact on the flame speed due to the $H_2O$ produced by combustion is therefore incorporated into the model results.

Figure 3:
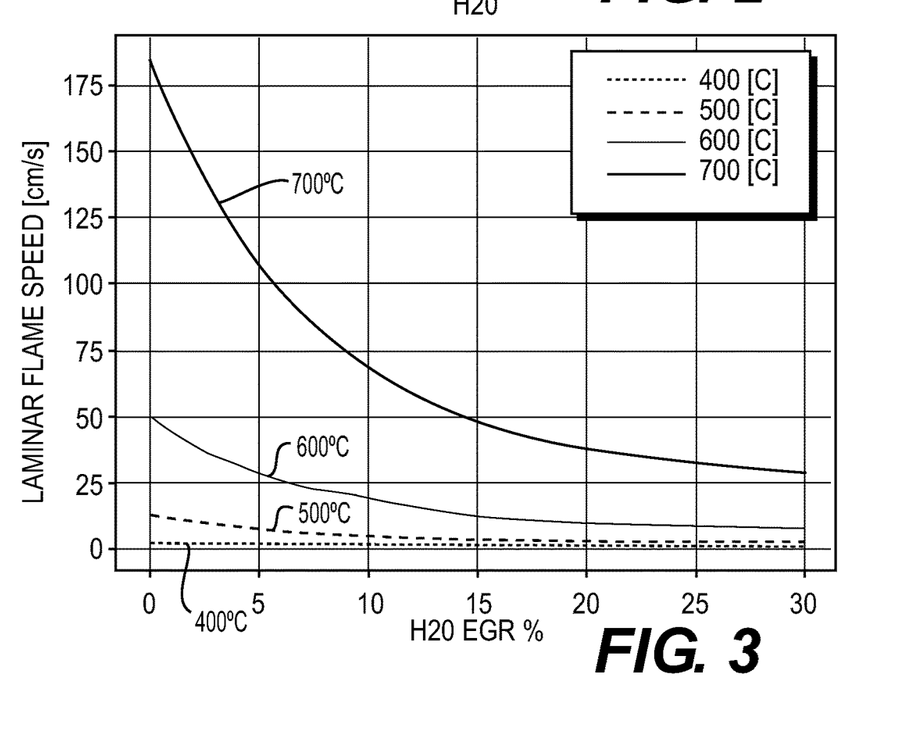
FIG. 3 shows flame speed with various amounts of $H_2O$ in the diluent gas during combustion.

FIG. 3 shows a similar set of modeling results for inclusion of varying amounts of $H_2O$ in the diluent. As shown in FIG. 3, the flame speed curves for $H_2O$ are similar to the flame speed curves for $CO_2$. Thus, even though the heat capacities of $H_2O$ and $CO_2$ differ by more than 10%, the flame speed reduction is similar for both. At 700° C. it appears that addition of $H_2O$ provides a slightly greater reduction in flame speed than $CO_2$.

Example 2—Regeneration Diluent Including 30% High Heat Capacity Gas

A pilot scale reactor (length of ~12 inches/~30 cm) was used to investigate the impact and benefits of modifying flue gas exit temperatures on operation of a reverse flow reactor system. The examples provided herein correspond to results from a single reactor, but those of skill in the art will readily understand the application of the following results to reaction systems including plurality of reverse flow reactors.

The pilot reactor was used to perform steam reforming in a reverse flow reactor using various types of diluent gases. The steam reforming was performed at a methane feed rate of 2 scf/min. The flow rate during the regeneration step was roughly 18 scf/min (~510 liters/min). This included roughly 16.1 scf/min (~455 liters/min) of diluent and 1.9 scf/min (~55 liters/min) of $H_2$ as a fuel The pressure in the reactor for both the reaction step and the regeneration step was 150 psig (~1000 kPa-g).

Figure 4A:
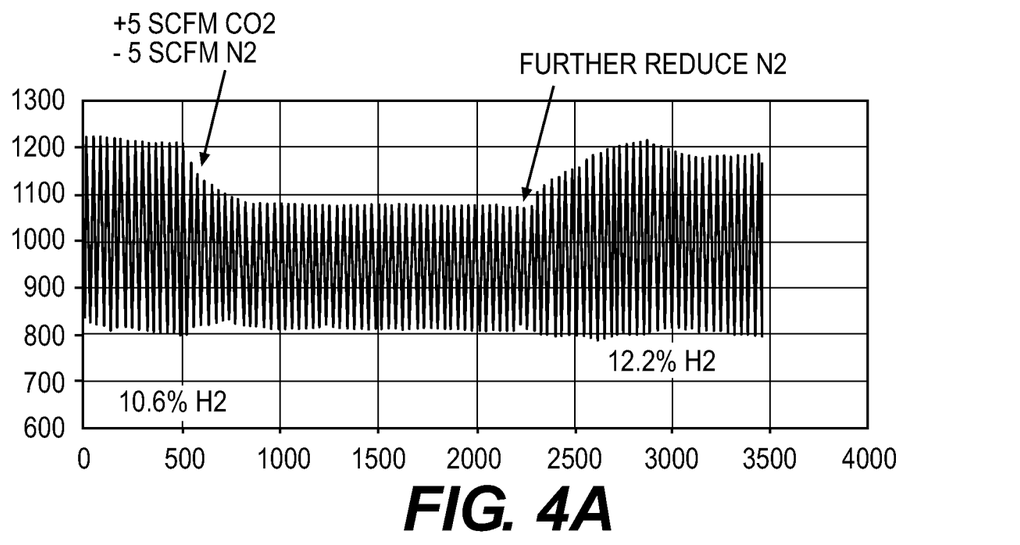
FIG. 4A shows how the composition of the fuel and diluent changed over time during the regeneration steps in the reactor.

FIG. 4A shows how the composition of the fuel and diluent changed over time during the regeneration steps in the reactor. Initially, 10.6 vol % of the flow into the reactor during regeneration corresponded to $H_2$ as a fuel. During the initial period, $N_2$ was used as substantially the entire diluent, although some smaller amounts of other gases typically present in air were included due to using air to provide the oxidant for the combustion reaction. These other gases corresponded to less than 15 vol % of the diluent.

Figure 4B:
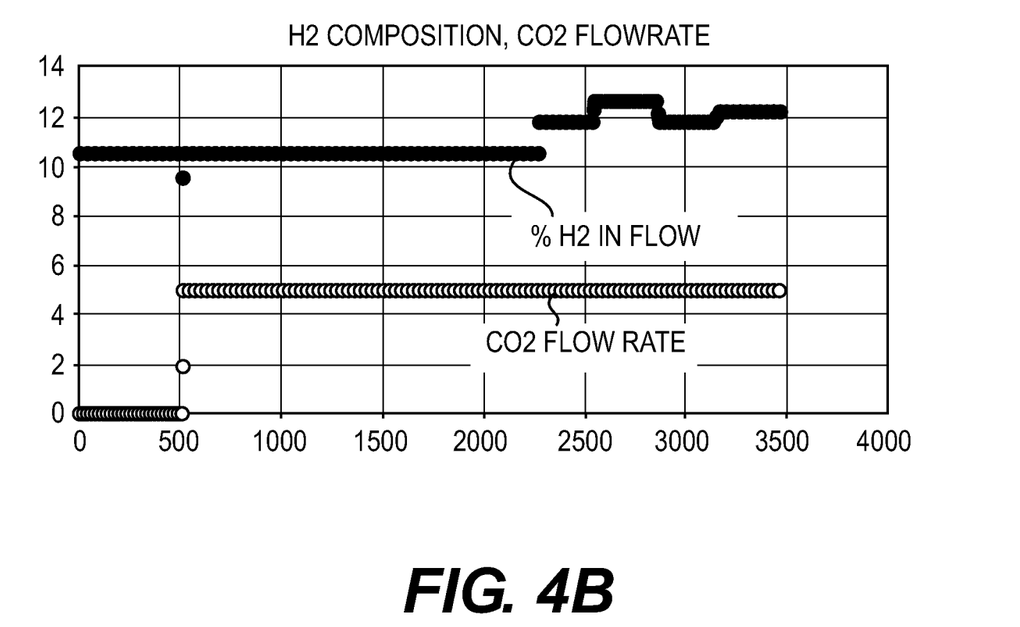
FIG. 4B shows the temperature at a location as a function of time.

In order to characterize the reactor, the temperature was sampled at 4 inches (~10 cm) from the end of the reactor where the regeneration gases enter. This location roughly corresponds to the location of the maximum in the temperature profile within the reactor. FIG. 4B shows the temperature at this location as a function of time. As shown in FIG. 4B, the temperature at the measured location reactor during the initial period was slightly greater than 1200° C. FIG. 4B also shows that the temperature cycled between a maximum of roughly 1220° C. at the end of the regeneration step and a minimum of roughly 800° C. at the end of the methane reforming step. This represents a temperature differential between the regeneration step and the reaction step of roughly 420° C.

After roughly 500 seconds of operation, FIG. 4A shows that 5.0 standard cubic feet per minute (~140 liters/min) of the $N_2$ diluent was replaced with 5.0 standard cubic feet per minute (~140 liters/min) of $CO_2$. This corresponded to replacing roughly 30 vol % of the diluent with $CO_2$. The temperature, pressure, and volume of the other input flows were kept the same. As shown in FIG. 4B, this resulted in a decrease of the maximum temperature from greater than 1200° C. to less than 1100° C. Next, fuel composition is increased to bring peak temperatures back up to greater than 1200 C. In this way, higher fuel compositions were used to create the same temperature profile within the reactor. This is achieved by reducing total diluent by roughly 15%. Although the regeneration volumetric flow during regeneration decreased, the amount of reforming performed during the reaction step remained substantially the same. This demonstrates that $CO_2$ can be used to replace $N_2$ as diluent to reduce regeneration volumetric flows within the reactor while still achieving similar reactivity. The reactor was operated under these conditions for roughly 2000 seconds to confirm that the reduced operating temperature could be maintained while also maintaining the same or a similar level of activity during the reaction step.

At 2500 seconds, additional $N_2$ was removed from the diluent. Instead of replacing the $N_2$ with other diluent, FIG. 4A shows that the amount of $H_2$ was increased from 10.6 vol % of the input flow to roughly 12.2 vol %. This increase in the amount of fuel represents a process intensification, as the additional heat generated during regeneration allowed additional reforming to be performed during the reaction step. As shown in FIG. 4B, this increased the maximum temperature in the reactor back to a temperature of slightly more than 1200° C. Thus, replacing roughly 10 vol % of the diluent during regeneration with $CO_2$ allowed for an increase in the amount of fuel used during regeneration of ~1.5 vol % (or an increase of ~15% relative to the starting amount), thus allowing for conversion of additional methane to $H_2$ during the reaction step.

Figure 5:
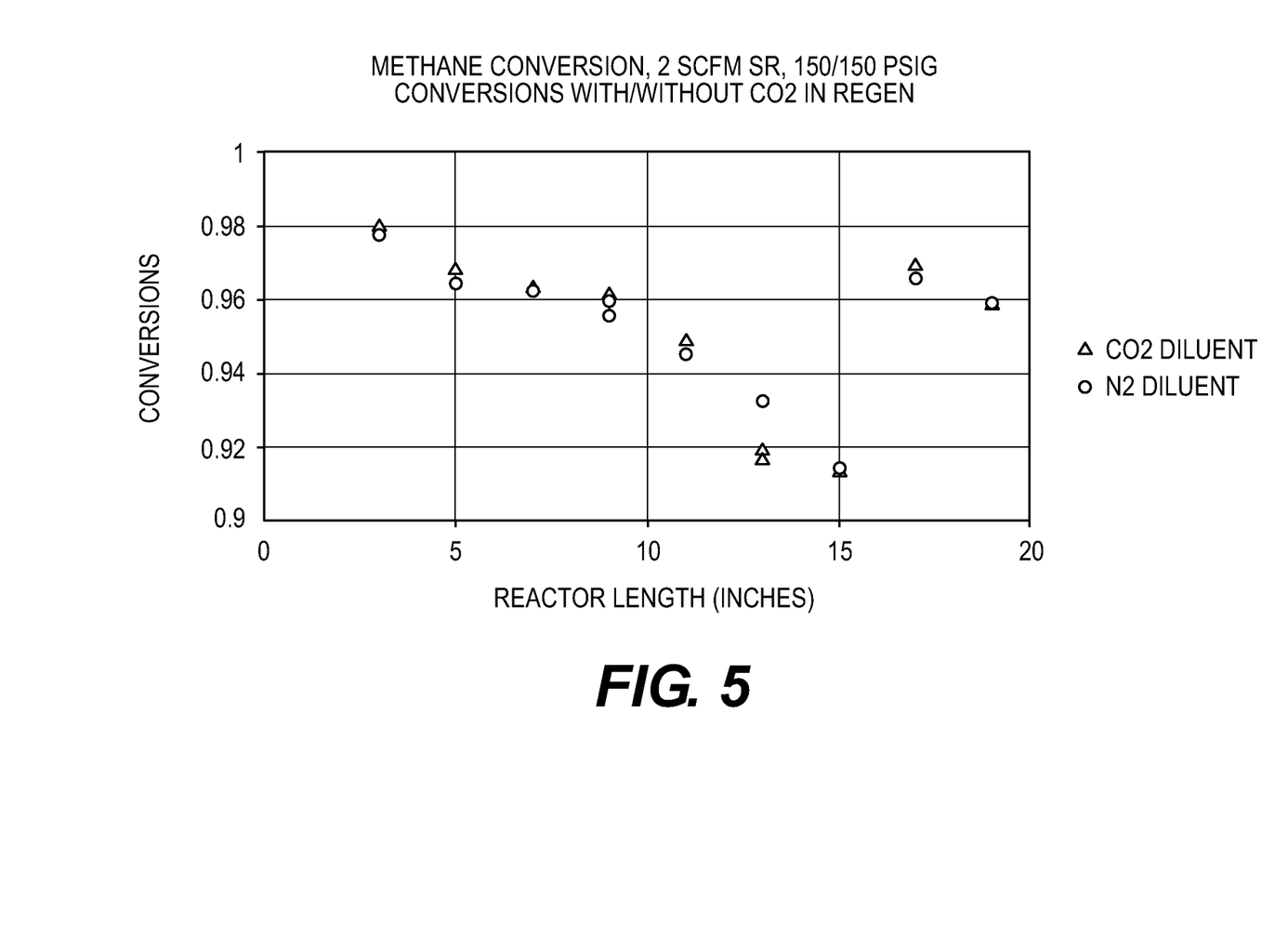
FIG. 5 shows methane conversion versus cycle time during steam reforming in a reverse flow reactor with different diluent gas compositions during regeneration.

FIG. 5 shows methane conversion versus cycle time for reforming performed under conditions similar to the conditions in FIG. 4A and FIG. 4B. As shown in FIG. 5, modifying the diluent to include 30 vol % $CO_2$ resulted in substantially the same conversion as operating the regeneration step with only $N_2$ as the diluent.

Additional Embodiments

Embodiment 1. A method for operating a reactor, comprising: reacting a fuel mixture comprising fuel, 0.1 vol % or more of $O_2$, and a diluent under combustion conditions in a combustion zone within a reactor to form a flue gas and to heat one or more surfaces in a reaction zone to a regenerated surface temperature of 800° C. or more, the diluent comprising 25.0 vol % or more of a gas having a heat capacity at 1500 K of 40 J/mol*K or more relative to a volume of the diluent, the reaction zone comprising a catalyst composition; and exposing a first reactant stream to the catalyst composition in the reaction zone at the regenerated surface temperature under endothermic reaction conditions to form a product stream, a direction of flow for the reactant stream within the reaction zone being reversed relative to a direction of flow for the fuel mixture.

Embodiment 2. The method of Embodiment 1, wherein the diluent comprises 10 vol % to 90 vol % (or 25 vol % to 90 vol %) of a gas having a heat capacity at 1500 K of 50 J/mol*K or more, the gas having a heat capacity at 1500 K of 50 J/mol*K or more optionally being $CO_2$, the fuel optionally comprising 90 vol % or more $H_2$.

Embodiment 3. The method of any of the above embodiments, wherein the diluent comprises 45 vol % or more of the gas having a heat capacity at 1500 K of 40 J/mol*K or more, the gas having a heat capacity at 1500 K of 40 J/mol*K or more optionally comprising $H_2O$, $CO_2$, or a combination thereof.

Embodiment 4. The method of any of the above embodiments, wherein the diluent comprises an average heat capacity at 1500 K of 38 J/mol*K or more.

Embodiment 5. The method of any of the above embodiments, wherein the combustion conditions comprise a temperature of 600° C. or more.

Embodiment 6. The method of any of the above embodiments, wherein the reactant stream comprises a reformable hydrocarbon and steam, and wherein the endothermic reaction conditions comprise reforming conditions, the reformable hydrocarbon optionally comprising methane.

Embodiment 7. The method of any of the above embodiments, further comprising recycling a portion of the flue gas to form at least a portion of the diluent, the diluent comprising 50 vol % or more of the recycled portion of the flue gas.

Embodiment 8. The method of any of the above embodiments, wherein the combustion conditions comprise a laminar flame speed of 100 cm/s or less.

Embodiment 9. The method of any of the above embodiments, wherein the fuel comprises $H_2$.

Embodiment 10. The method of any of the above embodiments, wherein the product stream comprises $H_2$, the fuel comprising a portion of the product stream.

Embodiment 11. The method of any of the above embodiments, wherein the reactor comprises a reverse flow reactor, or wherein the reactor comprises a reactor system, the reactor system comprising a recuperator portion and a portion including the reaction zone, or a combination thereof.

Embodiment 12. The method of any of the above embodiments, the method further comprising compressing the recycled portion of the flue gas prior to mixing the recycled portion of the flue gas with the fuel, wherein at least a portion of the gas having a heat capacity at 1500 K of 40 J/mol*K or more is added to the recycled portion of the flue gas prior to the mixing.

Embodiment 13. A reverse flow reactor system comprising: a reactor comprising a reactor inlet end and a regenerator inlet end; a recycle loop providing intermittent fluid communication between the reactor inlet end and the regenerator inlet, the recycle loop comprising a recycle compressor and a fuel source inlet; and one or more supplemental diluent inlets in fluid communication with at least one of the recycle loop and the fuel source inlet.

Embodiment 14. The system of Embodiment 13, the system further comprising a $CO_2$ source, an $H_2O$ source, or a combination thereof in fluid communication with the one or more supplemental diluent inlets.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for operating a reactor, comprising:
   reacting a fuel mixture comprising fuel, 0.1 vol % or more of $O_2$, and a diluent under combustion conditions in a combustion zone within a reactor to form a flue gas and to heat one or more surfaces in a reaction zone to a regenerated surface temperature of 800° C. or more, the diluent comprising a plurality of gases different from the fuel and the $O_2$, the diluent comprising 45 vol % or more of at least one gas having a heat capacity at 1500 K of 40 J/mol*K or more relative to a volume of the diluent, the reaction zone comprising a catalyst composition; and exposing a first reactant stream to the catalyst composition in the reaction zone at the regenerated surface temperature under endothermic reaction conditions to form a product stream, a direction of flow for the reactant stream within the reaction zone being reversed relative to a direction of flow for the fuel mixture.

2. The method of claim 1, wherein the diluent comprises 10 vol % to 90 vol % of at least one gas having a heat capacity at 1500 K of 50 J/mol*K or more.

3. The method of claim 1, wherein the diluent comprises 10 vol % or more $CO_2$, and wherein the fuel comprises 90 vol % or more $H_2$.

4. The method of claim 1, wherein the diluent comprises 25 vol % or more $CO_2$.

5. The method of claim 1, wherein the gas having a heat capacity at 1500 K of 40 J/mol*K or more comprises $H_2O$, $CO_2$, or a combination thereof.

6. The method of claim 1, wherein the diluent comprises an average heat capacity at 1500 K of 38 J/mol*K or more, wherein the average heat capacity is calculated as the average of the heat capacities of the gases in the diluent, weighted by the relative number of moles of each gas in the diluent.

7. The method of claim 1, wherein the reactant stream comprises a reformable hydrocarbon and steam, and wherein the endothermic reaction conditions comprise reforming conditions.

8. The method of claim 7, wherein the reformable hydrocarbon comprises methane.

9. The method of claim 7, the method further comprising compressing the recycled portion of the flue gas prior to mixing the recycled portion of the flue gas with the fuel, wherein at least a portion of the at least one gas having a heat capacity at 1500 K of 40 J/mol*K or more is added to the recycled portion of the flue gas prior to the mixing.

10. The method of claim 1, further comprising recycling a portion of the flue gas to form at least a portion of the diluent, the diluent comprising 50 vol % or more of the recycled portion of the flue gas.

11. The method of claim 1, wherein the combustion conditions comprise a laminar flame speed of 100 cm/s or less.

12. The method of claim 1, wherein the fuel comprises $H_2$.

13. The method of claim 12, wherein the product stream comprises $H_2$, the fuel comprising a portion of the product stream.

14. The method of claim 1, wherein the reactor comprises a reactor system, the reactor system comprising a recuperator portion and a portion including the reaction zone.

* * * * *